United States Patent
Hansen et al.

(10) Patent No.: US 8,559,418 B2
(45) Date of Patent: Oct. 15, 2013

(54) METHOD, SYSTEM, AND DEVICE FOR SETTING UP A CALL USING A GLOBAL REGISTRY

(75) Inventors: Robert A. Hansen, Langley (GB); Paul Witty, Langley (GB)

(73) Assignee: Cisco Technology, Inc., San Jose, CA (US)

( * ) Notice: Subject to any disclaimer, the term of this patent is extended or adjusted under 35 U.S.C. 154(b) by 463 days.

(21) Appl. No.: 12/829,088

(22) Filed: Jul. 1, 2010

(65) Prior Publication Data

US 2011/0002328 A1   Jan. 6, 2011

Related U.S. Application Data

(60) Provisional application No. 61/222,291, filed on Jul. 1, 2009.

(30) Foreign Application Priority Data

Jul. 1, 2009   (NO) .................................. 20092479

(51) Int. Cl.
*H04L 12/66*   (2006.01)

(52) U.S. Cl.
USPC ........................................................ 370/352

(58) Field of Classification Search
USPC ................................. 370/355, 356, 351, 352
See application file for complete search history.

(56) References Cited

U.S. PATENT DOCUMENTS

| | | | | |
|---|---|---|---|---|
| 6,622,027 | B1 * | 9/2003 | Menzel et al. ............... | 455/560 |
| 7,555,555 | B2 * | 6/2009 | Park et al. .................... | 709/227 |
| 7,774,368 | B2 * | 8/2010 | Ring et al. .................... | 707/792 |
| 8,032,559 | B2 * | 10/2011 | Ring et al. .................... | 707/792 |
| 8,255,501 | B2 * | 8/2012 | Dorenbosch et al. ......... | 709/222 |
| 2002/0181460 | A1 * | 12/2002 | Strathmeyer et al. ......... | 370/389 |
| 2004/0139209 | A1 * | 7/2004 | Mussman et al. ............. | 709/230 |
| 2005/0074106 | A1 * | 4/2005 | Orlamunder et al. ..... | 379/201.12 |
| 2005/0129003 | A1 * | 6/2005 | Baeder et al. ................ | 370/352 |

(Continued)

FOREIGN PATENT DOCUMENTS

| | | |
|---|---|---|
| EP | 0 972 411 B1 | 7/2002 |
| EP | 1 420 572 A1 | 5/2004 |
| GB | 2 432 475 A | 5/2007 |
| WO | WO2010137008 | * 12/2010 |

OTHER PUBLICATIONS

Extended European Search Report issued Nov. 7, 2012 in European Patent Application No. 10794410.0.

*Primary Examiner* — Asad Nawaz
*Assistant Examiner* — Syed S Ali
(74) *Attorney, Agent, or Firm* — Oblon, Spivak, McClelland, Maier & Neustadt, L.L.P.

(57) ABSTRACT

A method, system, and device for establishing a call using a single identifier, which includes receiving contact information relating to the single identifier from an uploading device, the contact information identifying at least one protocol, storing the contact information received from the uploading device, retrieving the stored contact information and transmitting a message including the contact information, in response to a request from a call server for the contact information relating to the single identifier, receiving a request from a first communication device to establish a call to a second communication device associated with the single identifier, requesting the contact information relating to the single identifier, receiving the contact information relating to the single identifier, and establishing a call between the first communication device and the second communication device associated with the single identifier using the at least one protocol.

24 Claims, 6 Drawing Sheets

(56) References Cited

U.S. PATENT DOCUMENTS

| | | |
|---|---|---|
| 2005/0180435 A1* | 8/2005 | Hsu ................................ 370/401 |
| 2007/0064920 A1* | 3/2007 | Ruckart ..................... 379/355.07 |
| 2007/0206585 A1* | 9/2007 | Lee ................................ 370/356 |
| 2007/0248077 A1* | 10/2007 | Mahle et al. .................. 370/352 |
| 2007/0280213 A1* | 12/2007 | Sindhwani et al. ........... 370/356 |
| 2007/0286157 A1* | 12/2007 | Shaikh et al. ................. 370/351 |
| 2008/0059627 A1* | 3/2008 | Hamalainen et al. ......... 709/224 |
| 2009/0041034 A1* | 2/2009 | Boucadair et al. ............. 370/400 |
| 2009/0265198 A1* | 10/2009 | Lester et al. ........................ 705/7 |
| 2009/0316683 A1* | 12/2009 | Gass et al. ..................... 370/352 |
| 2010/0002686 A1* | 1/2010 | Rosenberg et al. ............ 370/352 |
| 2010/0046507 A1* | 2/2010 | Rosenberg et al. ............ 370/352 |
| 2010/0077082 A1* | 3/2010 | Hession et al. ................ 709/227 |
| 2010/0115115 A1* | 5/2010 | Terrill ........................... 709/229 |
| 2012/0243530 A1* | 9/2012 | Rosenberg et al. ............ 370/352 |

* cited by examiner

Fig. 2

Example 1:

Example 2:

Example 3:

Fig. 3

Example 1:

```
<register>
 <registration>
   <country-code>86</country-code>
   <range-start>1085199700</range-start>
   <range-end>1085199799</range-end>
 </registration>
 <contact>
   <protocol>sip</protocol>
   <data>    Hostname: 10.2.133.149
       Port: 5060,5061
       Protocol: TLS
   </data>
 </contact>
</register>
```

Example 2:

```
<register>
 <registration>
   <country-code>44</country-code>
   <number>2079021400</number>
 </registration>
 <contact>
   <protocol>xmpp-jingle</protocol>
   <data>
     <jid>romeo@montague.lit</jid>
     <capabilities>
       <feature var='urn:xmpp:jingle:apps:rtp:audio'/>
       <feature var='urn:xmpp:jingle:apps:rtp:video'/>
       <feature var='urn:xmpp:jingle:1'/>
       <feature var='urn:xmpp:jingle:transports:ice-udp:1'/>
       <feature var='urn:xmpp:jingle:transports:raw-udp:1'/>
     </capabilities>
   </data>
 </contact>
 <contact>
   <protocol>h323</protocol>
<data>gatekeeper=montague.lit:1719;mask_length=12;max_bandwidth=2000000</data>
 <contact>
</register>
```

METHOD, SYSTEM, AND DEVICE FOR SETTING UP A CALL USING A GLOBAL REGISTRY

CROSS-REFERENCE TO RELATED APPLICATIONS

The present application claims the benefit under 35 U.S.C. §119 from U.S. Provisional Application No. 61/222,291, filed Jul. 1, 2009, and claims priority to Norwegian Patent Application No. 20092479, filed Jul. 1, 2009, which are both herein incorporated by reference in their entirety.

BACKGROUND

1. Technological Field

The present disclosure relates to managing a global registry of contact information of a communication device, and a method of setting up a call using the global registry of contact information.

2. Description of the Related Art

For many decades, the standard means of real-time, long-distance communication has been the telephone. Almost every individual within an organization has a telephone number which is globally unique and from which an individual may be reached by any telephone world wide.

In more recent years, calls via Internet Protocol (IP) have been gaining prominence, as they have a number of advantages. Some advantages may include that the calls are free at the point of use, can offer better audio fidelity using high-quality audio codecs, and allow video and data sharing as well as voice. Where both circuit switched and packet switched systems are available, packet switched (i.e., IP) calls are generally made in preference to circuit switched (i.e., telephone) calls.

Conventionally, individuals provide their contact information in the form of a telephone number, which is short, globally unique, easy to use, and is usable between organizations which have had no previous contact. However, a telephone number only provides the facility to make voice calls, and at a relatively low quality.

Within a network, many IP setups support ways of mitigating the complexity of making an IP media call (i.e., preconfigured address books on an endpoint let a user call an individual by selecting the individual from a list). In other more sophisticated setups, endpoints register their availability to a central server which can then route calls as well as push out lists of users to the endpoints.

These solutions generally only work within an organization, since they rely on endpoints and servers having the information available to them already. Thus, these solutions only allow individuals to call users whose details are already in the system.

This becomes problematic when an individual wishes to call a user from a different organization, whose details are not already configured on the endpoints and servers. In this situation, the individual needs to know the call protocol and routing information of the organization he or she wishes to call, as well as the identifier which enables the call to be routed to the correct individual within the organization. The caller must also have enough technical understanding to configure his or her endpoint to make such a call. In addition, the servers on both ends of the call must be configured to make and receive calls through a common network, such as the Internet.

If, for some reason, the IP call cannot be successfully made, the caller must resort back to a standard telephone call, which requires a new call attempt to be made, with different contact information (the telephone number) and often on an entirely different device (i.e., a telephone rather than a video endpoint).

Telephone numbers are a long-established method of making telephone calls, which are arranged in a hierarchical fashion, with the world zone the first digit, followed by the country code, the national direct dialing code for regions within the country, and so forth to greater and greater levels of specificity.

Figure 1:
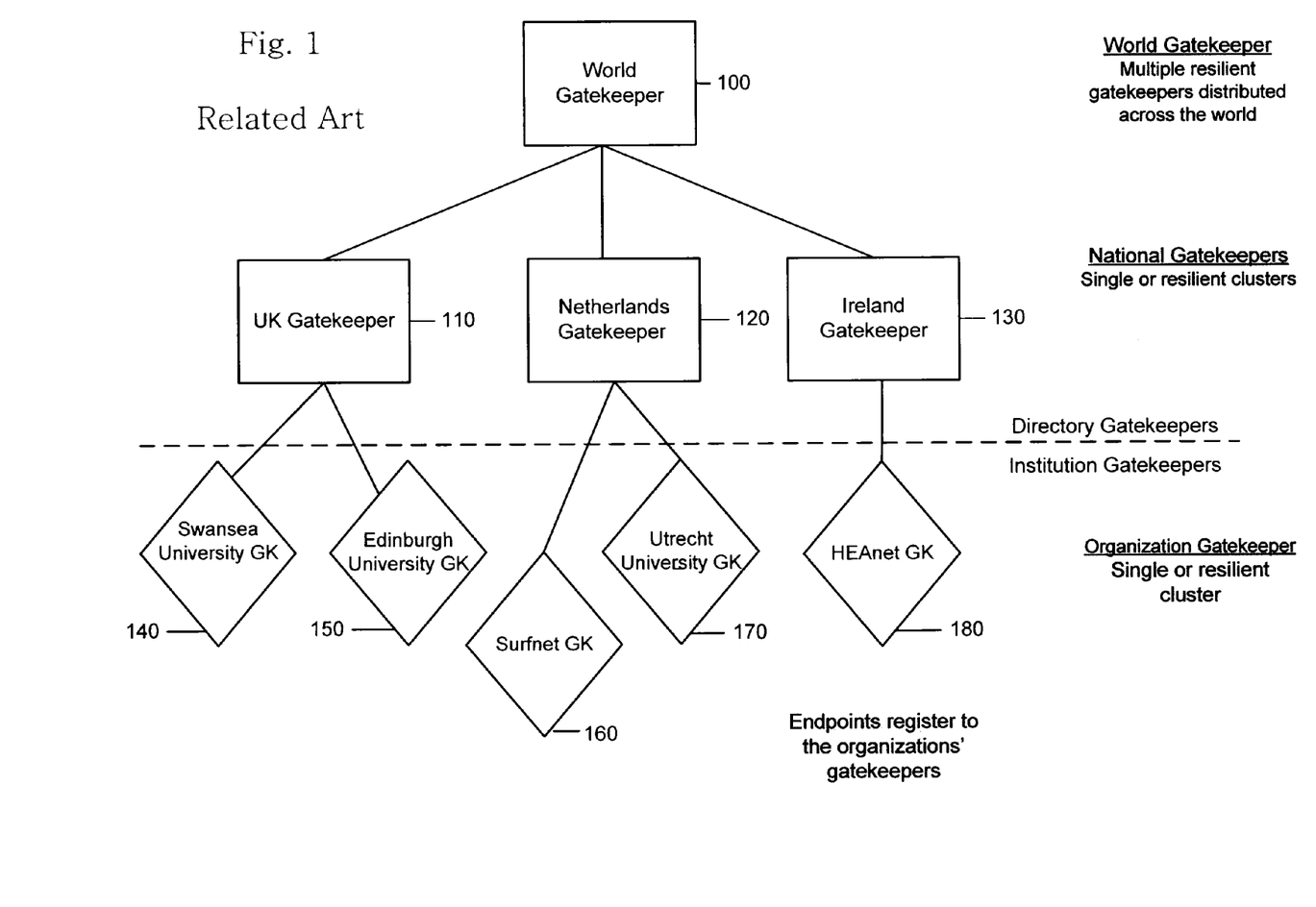
FIG. 1 shows a conventional hierarchal H.323 Global Dialing Scheme.

FIG. 1 shows an H.323 Global Dialing Scheme (GDS) adopted by some countries, reusing the hierarchical system of telephone calls. FIG. 1 shows a world gatekeeper 100 representing multiple resilient gatekeepers distributed across the world. National gatekeepers, such as, a UK gatekeeper 110, a Netherlands gatekeeper 120, and an Ireland gatekeeper 130 represent single or resilient clusters. Organization gatekeepers, such as, the Swansea University gatekeeper 140, the Edinburgh University gatekeeper 150, the Surfnet gatekeeper 160, the Utrecht University gatekeeper 170, and the HEAnet gatekeeper 180 also represent single or resilient clusters. Endpoints may, in turn, register to the organizations' gatekeepers. The GDS utilizes a hierarchical system of gatekeepers, wherein the prefixes indicate the gatekeeper level in the hierarchy (i.e., "00" indicates the world gatekeeper, "0044" indicates the UK gatekeeper, etc.).

Call protocols (i.e., Session Initiation Protocol (SIP), H.323, or the like) have standard ports (i.e., 5060 for SIP User Datagram Protocol (UDP)/Transmission Control Protocol (TCP), 5061 for SIP Transport Layer Security (TLS), 1720 for H.323, or the like). As long as the organization to be called has used these ports, there is no need for the port to be specified.

Some endpoints (i.e., Tandberg MXP, Tandberg Lifesize, or the like) make multiple connection attempts with different call protocols from the same address (i.e., first SIP is tried, then if not successfully answered, H.323 is tried). As the call attempts are made in sequence, and the later protocols are only tried once the previous have been rejected or timed out, this method has the disadvantages that it can be slow to connect or fail to connect. The method might also not work for all addresses since different protocols use different forms of address (SIP uses a Uniform Resource Identifier (URI) of the form username@hostname, H323 uses a hostname with an optional E164 number, etc).

The Tandberg IP Gateway is a single point of entry for external IP calls, which can be presented with an auto-generated entry screen of options and/or routed using a dial-plan. The Gateway is designed to understand as many protocols as possible so that a user may only have to publish its hostname to be externally contactable.

Domain Name System (DNS) is a long-established system for translating between a globally unique human-readable domain name and an IP address which can be used to contact a service provided on the Internet.

Private Branch Exchange (PBX) systems such as Cisco Call Manager have substantial penetration of business organizations. PBX systems offer the facility to translate from their internal call protocol to standard telephone calls for external calls, as well as being able to make IP calls using protocols such as SIP, by dialing a number into a phone, given the correct configuration.

SUMMARY

A method, system, and device for establishing a call using a single identifier, which includes receiving contact information relating to the single identifier from an uploading device, the contact information identifying at least one protocol, storing the contact information received from the uploading device, retrieving the stored contact information and transmitting a message including the contact information, in response to a request from a call server for the contact information relating to the single identifier, receiving a request from a first communication device to establish a call to a second communication device associated with the single identifier, requesting the contact information relating to the single identifier, receiving the contact information relating to the single identifier, and establishing a call between the first communication device and the second communication device associated with the single identifier using the at least one protocol.

As should be apparent, a number of advantageous features and benefits are available by way of the disclosed embodiments and extensions thereof. It is to be understood that any embodiment can be constructed to include one or more features or benefits of embodiments disclosed herein, but not others. Accordingly, it is to be understood that the embodiments discussed herein are provided as examples and are not to be construed as limiting, particularly since embodiments can be formed to practice the invention that do not include each of the features of the disclosed examples.

BRIEF DESCRIPTION OF THE DRAWINGS

The disclosure will be better understood from reading the description which follows and from examining the accompanying figures. These are provided solely as non-limiting examples of embodiments. In the drawings.

DETAILED DESCRIPTION

The present disclosure presents systems and methods for allowing a caller using an IP communication device to contact a user in an external organization using a single identifier, such as a telephone number, without the caller having any knowledge of the IP capabilities of the called user. This is utilized by communicating with a registry device (i.e., a Global Address Database (GAD)). The GAD contains contact information, such as Internet Protocol (IP) capabilities, for registered numbers. When trying to make a call to a given number, a call server or similar device at the site at the caller side, requests contact information relating to that number from the GAD, then sets up a call based on the information received from the GAD.

Figure 2:
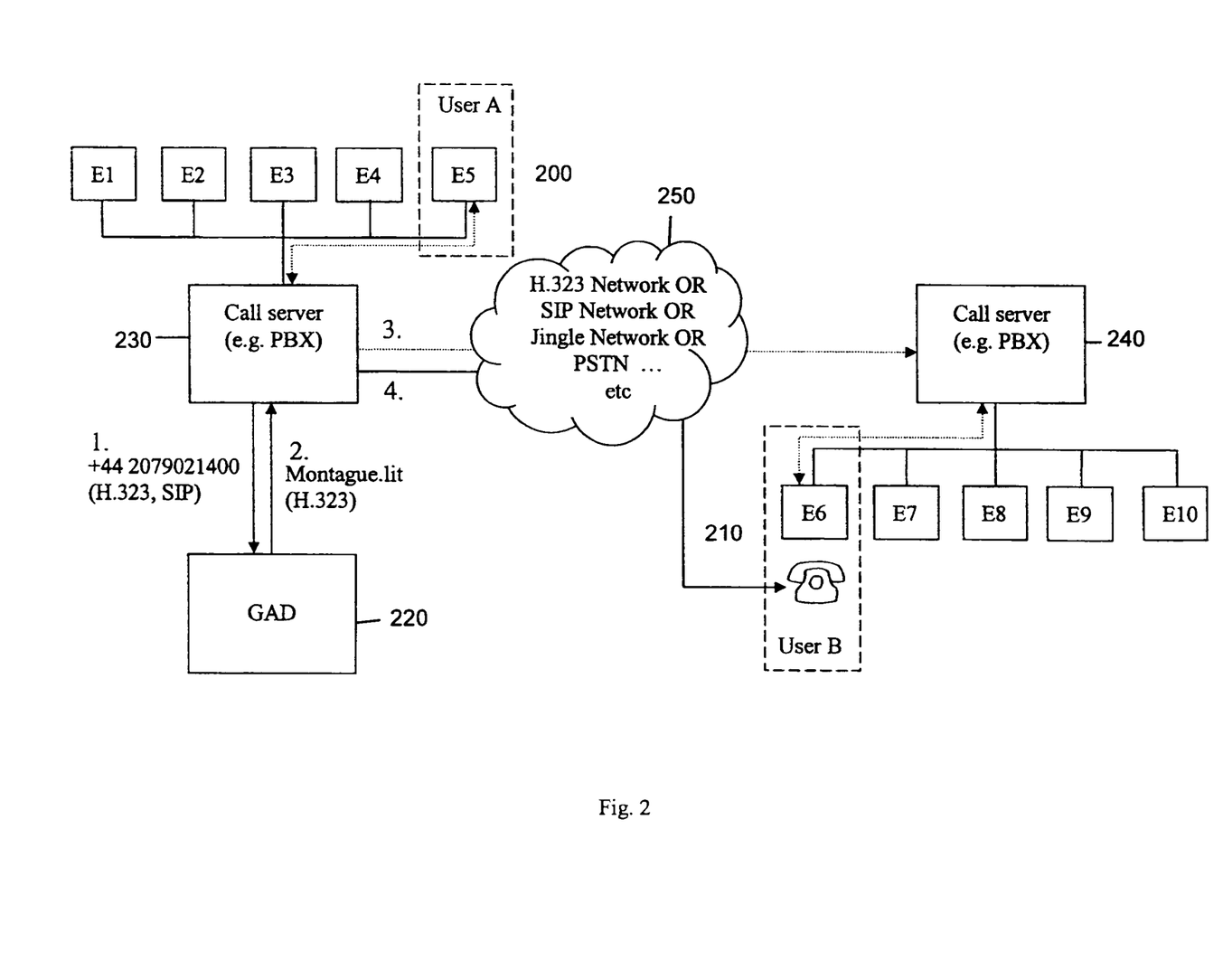
FIG. 2 illustrates an exemplary embodiment of a communication system according the present disclosure.

FIG. 2 illustrates an embodiment of a communication system according to the present disclosure. The system includes at least one GAD 220, a call server 230, a call server 240, a communication network 250, and two communication devices, 200 and 210. The communication network 250 may be a packet switched network employing protocols such as H.323, Session Initiation Protocol (SIP), Jingle, or the like. The communication network 250 may also be a circuit switched network such as Public Switched Telephone Network (PSTN). Similarly, the communication devices, 200 and 210, may be communication devices supporting calls on at least one protocol such as H.323, SIP, Jingle, or the like, but may also be a regular telephone. The call server 230 may be any kind of call server such as, but not limited to, a Private Branch Exchange (PBX), a gateway, a gatekeeper, or an endpoint with integrated call server functionality.

Figure 3:
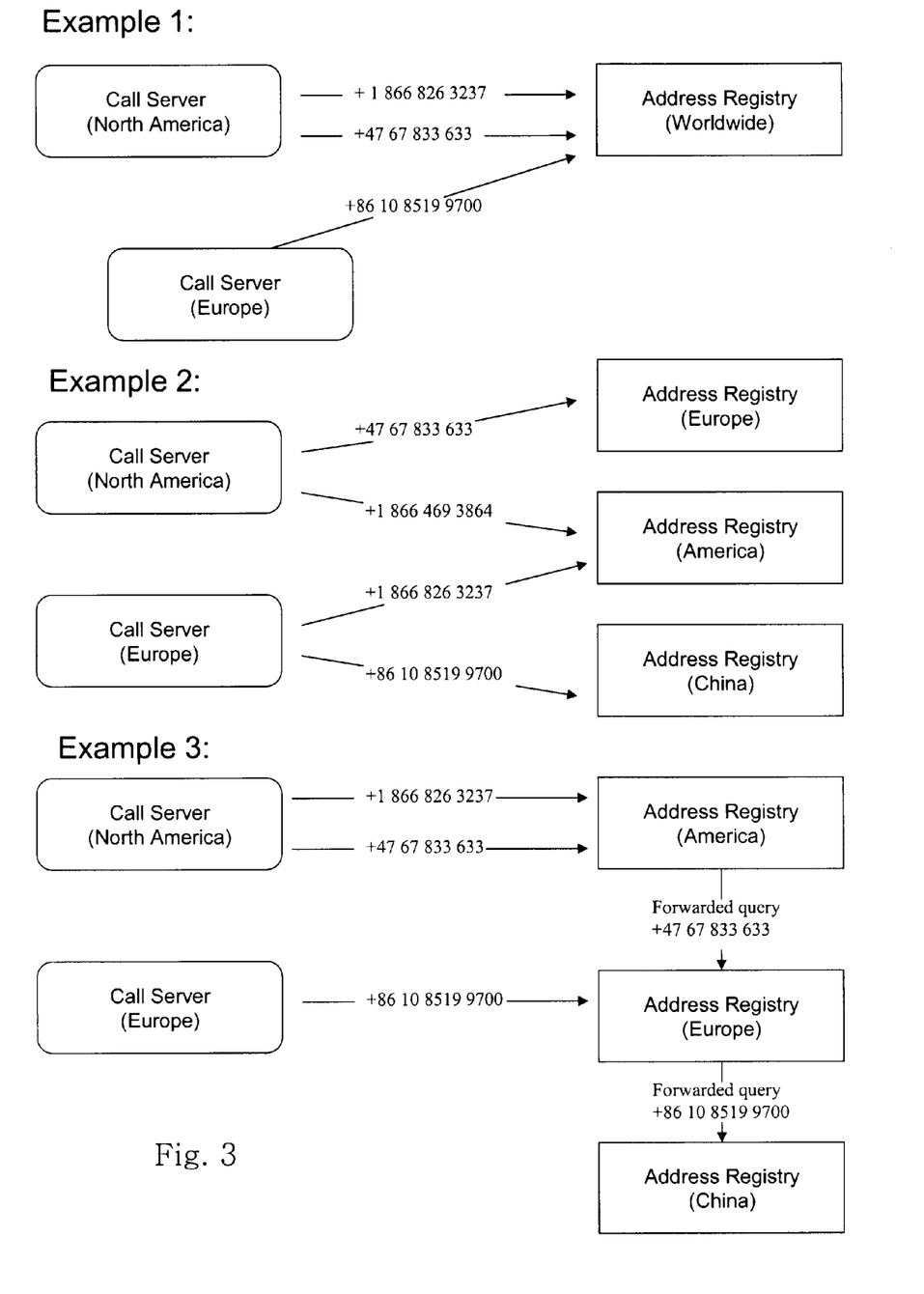
FIG. 3 illustrates exemplary embodiment of structures of registries according to the present disclosure.

In one embodiment, a single registry (i.e., GAD 220), can store and dispense all the contact information worldwide, as shown in FIG. 3, Example 1. However, with increased demand, it may be more advantageous to employ multiple registries, reducing the load on any given registry. One embodiment of deploying multiple registries (shown in FIG. 3, Example 3) is for any given calling device to have a single point of contact. In most cases, this point of contact is the registry which is geographically closest, which has the advantages of reducing the latency of a query, limiting transoceanic traffic, etc. In this embodiment, each registry is able to provide access to a complete set of records, either cached locally or by redirecting the caller to another registry when required. Mature strategies for implementing such systems, including failover and contact propagation between registries, have been developed for Domain Name System (DNS).

As with the Global Dialing Scheme (GDS), the nature of telephone numbers also allows other strategies to be implemented. In the exemplary embodiment of FIG. 3, Example 3, the first few digits of a telephone number are used to determine the world zone of the destination, the country of the destination, and even more fine division. Hence, a set of registries is set up with the calling system contacting the registry corresponding to the geographical area signified by the telephone numbers they are seeking to identify. While this means that a caller may have to contact multiple registries rather than the single closest one to retrieve contact information for a number of international calls, it also means each registry may only need to store contact information for its geographical region, rather than the global totality of the contact details.

Many other strategies are also possible. No matter whether a single, global registry is used, or many registries, the syntax of queries and uploads of contact information remains constant, allowing flexibility in the deployment of registries and giving the potential to migrate from one strategy to another should it seem advantageous to do so.

The GAD 220 contains information associating a single identifier (subsequently referred to as a telephone number) with IP contact information. The information is uploaded to the GAD 220 from an uploading entity. The uploading entity may be a gatekeeper of an organization, but may also be an ordinary network connected computer. The telephone number is provided to the GAD 220 as a single number or a range of numbers. Registering a range of numbers may generally be used to register a prefix (i.e., +47 67 833 000 to +47 67 833 999 corresponding to registering the prefix +47 67 833). However, in the case where an organization has been allocated a range of telephone numbers rather than a prefix, the allocated range will be registered (i.e., registering numbers in the range +47 67 833 200 to +47 67 833 700).

The uploading entity and any calling device receiving information from the GAD 220 needs to understand the contact information. The GAD 220 itself, however, does not need to understand the information it contains. One advantage of this is that the GAD 220 does not need to parse the contact information, which leads to speeding up the request processing. Another advantage is that new protocols can be added to the registry without having to update the registry itself.

In an exemplary embodiment of the present disclosure, the GAD 220 differentiates individual protocols, allowing the GAD 220 to provide contact information requests with the protocols the requesting entity is able to utilize, and also allowing an uploading entity to overwrite a single set of protocol data without having to modify all the other sets of protocol data. Protocol data is thus paired with a protocol name field (i.e., SIP, H.323, Jingle, etc.) identifying the protocol. Following that, the GAD 220 does not need to understand the protocols, and there is no need for a pre-approved list over allowed protocol names.

The format of the individual protocol data fields may be established as a standard via a central authority, or through a system such as Remote Function Call (RFC). The data may be in the form of key/value pairs, and hence well suited to the use of RFC822, or Extensible Markup Language (XML).

Figure 4:
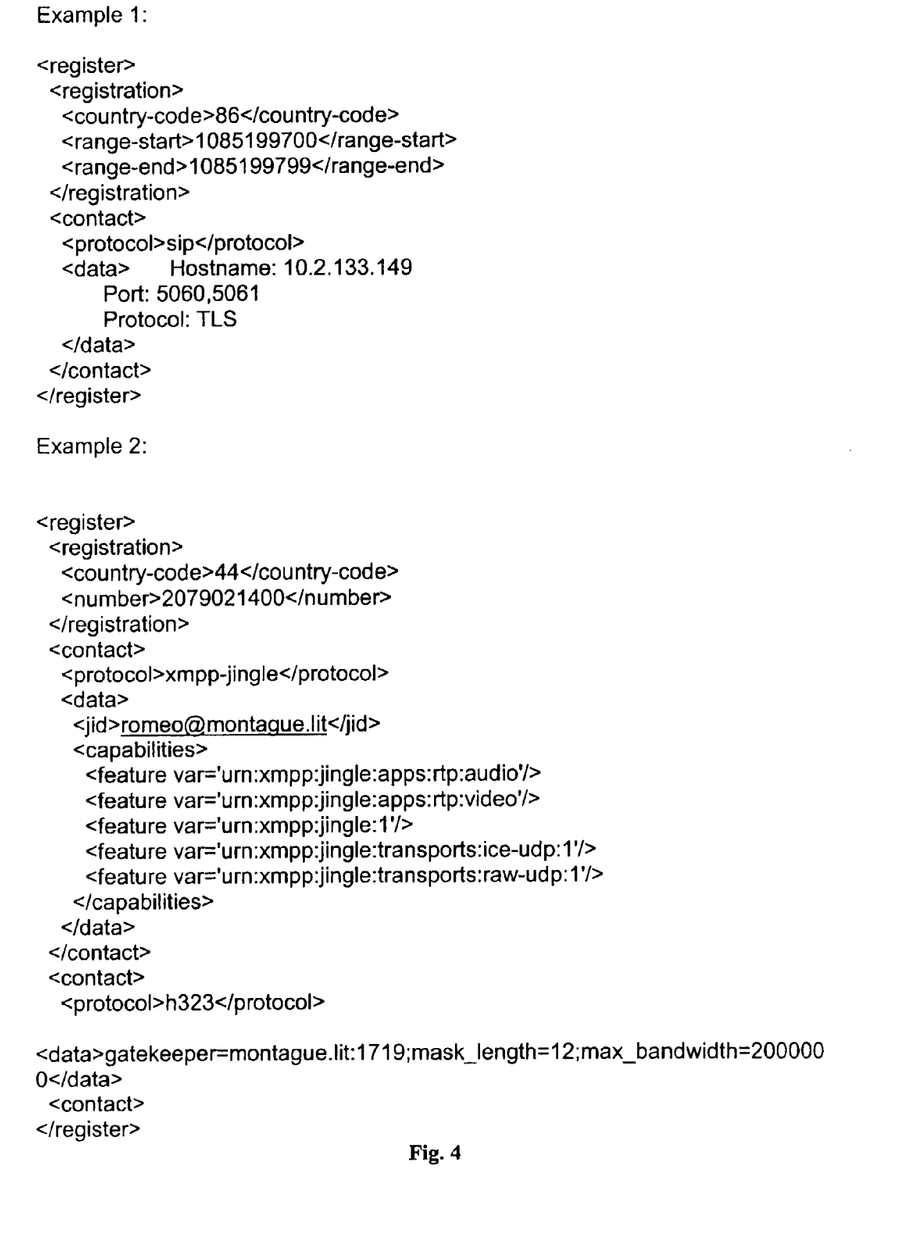
FIG. 4 illustrates an exemplary embodiment of registration packets uploaded to a registry according to the present disclosure.

FIG. 4 shows embodiments of contact information packets uploaded to the GAD 220. Example 1 shows a contact information packet registering a range of numbers, "1085199700" to "1085199799," with a corresponding country code "86." The contact information part of the information packet includes information that the registered range of numbers is serviced by an SIP device with IP-number "10.2.133.149" on ports "5060, 5061," using the Transport Layer Security (TLS) protocol.

Example 2 shows a contact information packet registering a single number with two different possibilities of contact available, Jingle and H.323. As shown in FIG. 4, the sets of protocol data may contain different values depending on the overlaying protocol (i.e., SIP can communicate via User Datagram Protocol (UDP), Transmission Control Protocol (TCP) and TLS). Thus, it may be necessary to communicate which of the underlying protocols is supported.

As described above, the data field has no objective meaning to the GAD 220. The data can be registered using different formats. For example, in FIG. 4, the SIP data is encoded using RFC822, the Extensible Messaging and Presence Protocol (XMPP)/Jingle data are XML stanzas describing the capabilities of the tar end embedded within the XML of the registration message, and the H.323 protocol data expressed in a list of key/value pairs.

Although the contact information is a matter of public record to be provided on external requests, it is evident that uploading contact information is considerably more sensitive, and measures should be taken in order to minimize the ability of malicious or misconfigured third-parties to upload information. Therefore, while the contact information packets can be uploaded to the GAD 220 using any suitable protocol including Internet-based protocols such as Hypertext Transfer Protocol (HTTP), File Transfer Protocol (FTP), Simple Mail Transfer Protocol (SMTP), Network News Transfer Protocol (NNTP), and XMPP, a digitally signed or authenticated and encrypted method may also be used to improve security.

In an exemplary embodiment of the present disclosure, a three tier security measure may be implemented, as listed below.
1) Confirmation of Identity. An uploading entity may need to supply a username and password when uploading contact information to the GAD 220. This may include the use of encrypted transport protocols such as TLS coupled with signed child certificates provided by a root authority (in this case, the administrating authority of the GAD 220), or other such mature methods of proving identity over an interne connection.
2) Limitations on Record-Changing. In the event of the above not providing protection (i.e., a valid but misconfigured call server), it may be beneficial to limit the changes an uploading entity can make. Sensible limits may include placing a lower bound on the shortness of the prefix that can be registered (i.e., not allowing an entity to register an entire country code such as "+44"), not allowing any range that encompasses an already existing range, limiting the number of ranges that a single entity can register, or the like.
3) Limitations on Access. Relative to the number of requests for the contact information, the number of record uploads may be low and less time-critical. Hence, additional constraints that do not scale well to large numbers of users may be imposed. One exemplary option is for the authority administrating the registry to white-list entities allowed to upload contact information to the registry. Another exemplary option is for the administering authority to validate changes in contact information (for instance, by contacting the organization by telephone or email) before implementing the changes. It may even be decided that only the administering authority can upload contact information, and an organization that seeks to do so must apply in writing, by telephone, or by some other method.

An exemplary calling device according to the present disclosure may be aware of its own location so that it can provide a complete telephone number, including area and country code, when querying a GAD 220. This allows the calling device to dial local numbers without area codes and/or country codes.

In an alternative embodiment, the calling device may connect to a location-specific GAD 220 (i.e., the caller device contacts a national address registry without needing to include the country code). In this case, the nation address registry knows the required information to produce the complete query telephone number.

Further, along with the number to be called, the contact information request may also include the protocols the caller device supports. This allows the address registry to filter the protocols it returns to the protocols understood by the calling device, thereby significantly reducing the return packet size in cases where the contact information includes numerous supported protocols.

While any protocol/transport mechanism may be used for the request, UDP is well suited since only a single set of results is returned, and lost packets in either direction may be handled by the calling device resending the request if, after a certain period, it has not received a response.

As with systems such as DNS, client implementations may cache contact information for external addresses so that later calls to the same number range is made without contacting the address registry. Various strategies are available to balance the tradeoff between call failures due to out-of-date contact information and polling the address registry with each call (i.e., updating the information after a call failure, updating the information on calling if more than a fixed period has passed since the last successful call, updating the information on calling if more than a fixed period has passed since the last time the information was updated, etc.).

Figure 5:
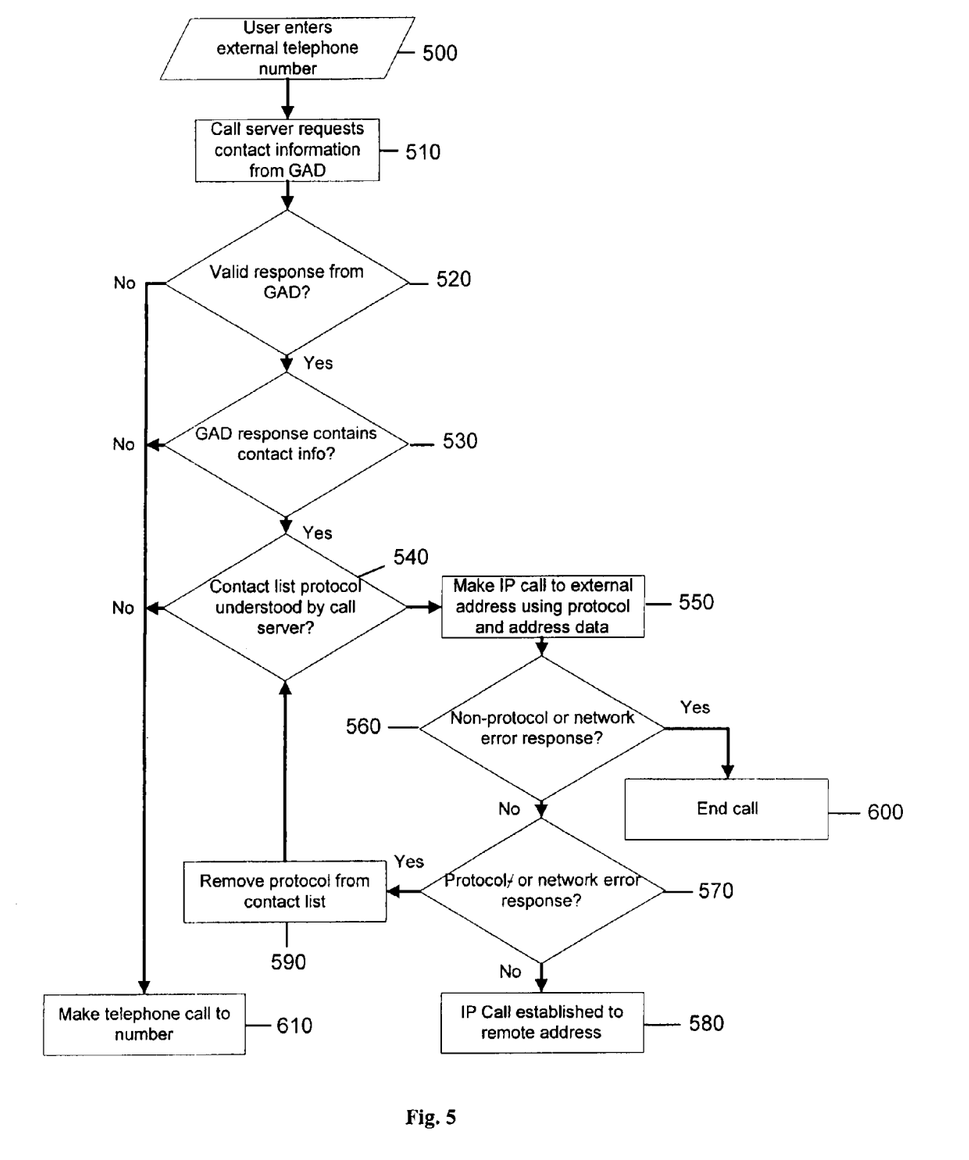
FIG. 5 is a flow diagram illustrating the method according to one embodiment of the present disclosure.

FIG. 5 illustrates an exemplary method according to the present disclosure, of setting up a call from a calling device to a device in an external organization. The method starts at step 500, where a user of a first calling device enters an external telephone number, and the calling device sets up a connection with a call server, typically at the boundary of the internal network. If the user did not enter the complete phone number, the call server may add area and/or country code to the entered telephone number.

Then, in step 510, the call server requests contact information from the GAD relating to that number. The GAD may be a single server, but may also be comprised of a plurality of geographically dispersed servers, as described above with reference to FIG. 1. The call server then waits for a valid response from the GAD, at step 520.

A valid response from the GAD is either a set of one or more protocol name and data pairs, or a message that no suitable contact protocol data is available (either because the requested number has no associated contact information in the address registry, or data does exist but the request specified a set of protocols it supported which do not match any of the protocols stored for that entry). The address registry may also return a telephone number range for which the contact information is valid, allowing the calling device and/or call server to cache the information more effectively. If no valid response is received after a certain time (step 520), or the GAD response does not contain contact information (step 530), the call server establishes a standard telephone call to the requested number (step 610).

In step 540, the calling server parses the contact information received from the GAD 220 to check whether the call server supports any of the protocols listed in the contact information. If none of the received protocols is supported by the call server, the call server establishes a standard telephone call to the requested number, at step 610.

If more than one valid protocol is present, the call server chooses which protocol is best suited. Parameters in the contact information may help make this choice (for example, one set of protocol data may state that it can only accept connections via TLS, which the call server does not support, allowing it to be discarded immediately, while another might state it supports only calls of 384 k or lower bandwidth for external calls, making this less attractive than a third protocol with no such bandwidth limit, etc.). In an embodiment of the present disclosure, the call server makes a prioritized list over the present supported protocols.

After selecting a preferred protocol, the call server then attempts to establish a call to the external location using the protocol data, at step 550. The exact format of this call may be protocol-dependent and defined alongside the format of the protocol data. The protocol data may include an address, port, and other contact information. The definition may also include a method of identifying the remote server of which individual the call should be routed to, if needed. One method is to use the complete telephone number as the username, e164, or other protocol user identifier. Another method may include applying a mask to the telephone number so that only part of the number is sent.

If, in step 560, the call fails due to non-network or non-protocol errors (for example, the individual at the far end chooses to reject the call, the remote server reports that there is no user with that number, etc.), the call should fail and other protocols/telephones should not be attempted. The user should be informed that the call failed, along with the reason for failing (step 600).

Then, in step 570, if the call cannot be established due to network or protocol errors, then the call server removes protocol from the preferred protocol list, at step 590, and attempts to establish a call on the next most preferred protocol on the list. This may continue until there are no protocols remaining, at which point the call server establishes a telephone call to the requested number, at step 610.

If the call succeeds, then the user has been successfully connected with an IP call with all its advantages (step 580).

Referring back to FIG. 2, an exemplary call scenario is described following the process of FIG. 5. User A, having access to a calling device E5 200, would like to make an IP call (i.e., a video call), to User B, located within a different organization. User A, for example, only has a business card with the phone number of User B, and as such, User A does not know whether User B can accept video calls or any other IP calls. User B, for example, may be registered in a GAD 220 of FIG. 4, Example 2.

User A enters the telephone number of User B (i.e., "+44 2079012400") on the calling device E5 200, which then connects to the call server 230 of User A's organization. The call server 230 then sends a request to GAD 220 requesting contact information data related to the phone number of User B. In this example, the call server supports H.323 and SIP, and requests receiving contact information supporting that protocol. User B, in this case, supports XMPP/Jingle and H.323, but as XMPP/Jingle information is not requested, GAD 220 transmits the H.323 information to the call server 230. Thus, User B can be reached through H.323 on a gatekeeper Montague.lit using extension 1719.

The call server 230 then connects to gateway 240 through IP network 250 using the H.323 protocol, and the call server 240, or gateway, connects the call to the communication device E6 210 of User B. Thus, the IP call is established. If, however, the call server 230 receives network protocol errors when trying to contact the gateway 240, then the call server 230 will drop the H.323 call and try to set up a telephone call to User B.

In another exemplary call scenario, the call server 230 supports both H.323 and XMPP/Jingle, in which case the GAD 220 returns both the H.323 and XMPP/Jingle contact information data. The call server 230 may prefer one of the protocols over the other, and thus makes a prioritized protocol call list, or randomly lists the protocols to call. In either case, the call server 230 first attempts one of the protocols (for example, the H.323). The call server 230 then connects the call server or gateway 240, through the IP network 250 using the H.323 protocol. If the call server 230 receives network protocol errors when trying to connect to the gateway 240, the call server 230 drops the H.323 call, and tries to establish a call using the next protocol in the list, in this case the XMPP/Jingle protocol. Again, if the call server 230 receives network errors, the call server 230 drops the call and tries to establish a telephone call to User B. Otherwise, an IP connection using Jingle is established.

In another exemplary embodiment, if User B is not listed in the GAD 220, the GAD 220 informs the call server 230 that no contact information data is registered for that number. In this case, the call server 230 tries to establish a telephone call to User B using the telephone number of the request.

Figure 6:
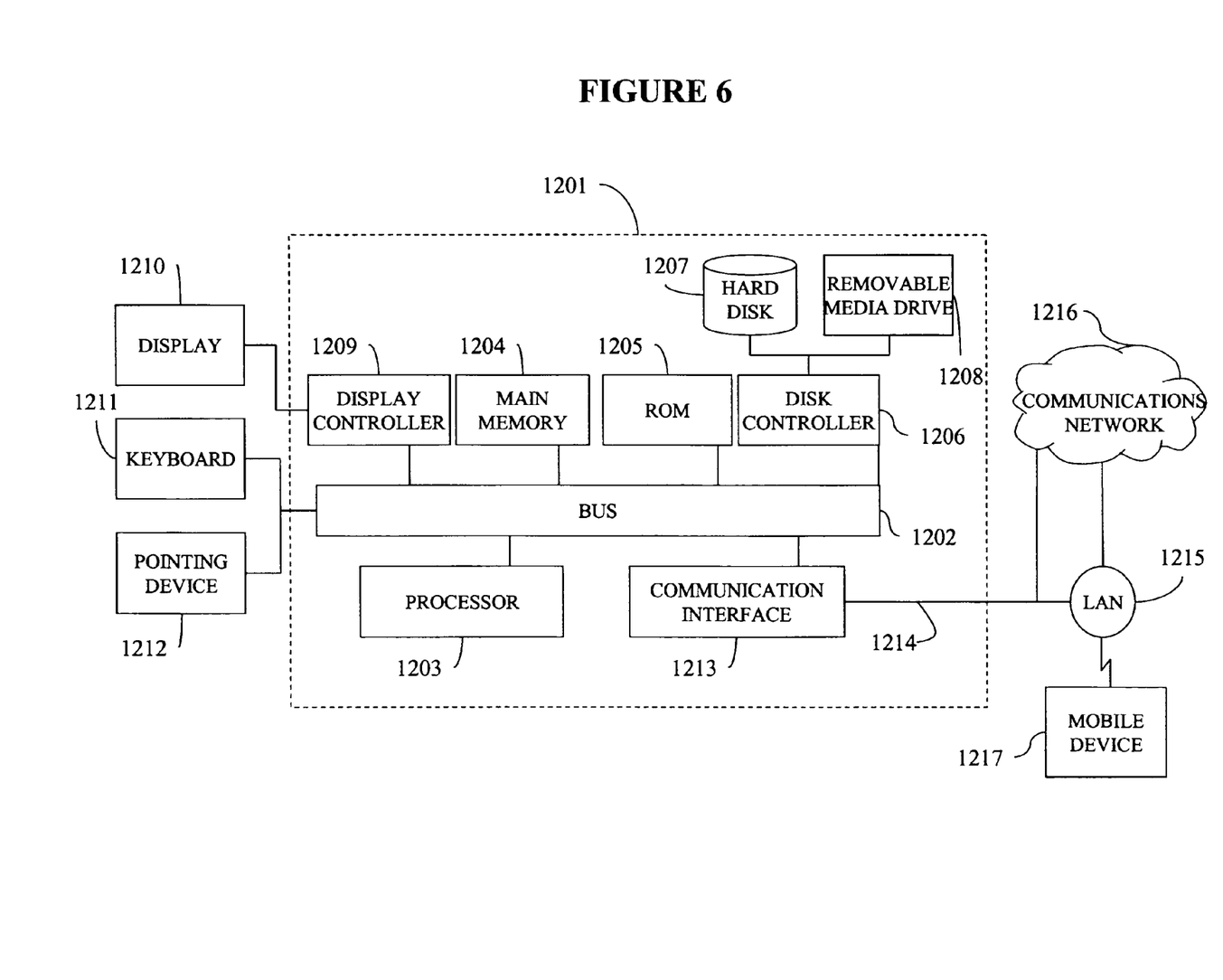
FIG. 6 illustrates a computer system upon which an embodiment of the present disclosure may be implemented.

FIG. 6 illustrates a computer system 1201 upon which a method of managing a global registry of contact information of a communication device, and setting up a call using the global registry of contact information according to the present disclosure may be implemented. The computer system 1201 includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as the touch panel display 101 or a liquid crystal display (LCD), for displaying information to a computer user. The computer system includes input devices, such as a keyboard 1211 and a pointing device 1212, for interacting with a computer user and providing information to the processor 1203. The pointing device 1212, for example, may be a mouse, a trackball, a finger for a touch screen sensor, or a pointing stick for communicating direction information and command selections to the processor 1203 and for controlling cursor movement on the display 1210.

The computer system 1201 performs a portion or all of the processing steps of the present disclosure in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the present disclosure and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes.

Stored on any one or on a combination of computer readable media, the present disclosure includes software for controlling the computer system 1201, for driving a device or devices for implementing the invention, and for enabling the computer system 1201 to interact with a human user. Such software may include, but is not limited to, device drivers, operating systems, and applications software. Such computer readable media further includes the computer program product of the present disclosure for performing all or a portion (if processing is distributed) of the processing performed in implementing the invention.

The computer code devices of the present embodiments may be any interpretable or executable code mechanism, including but not limited to scripts, interpretable programs, dynamic link libraries (DLLs), Java classes, and complete executable programs. Moreover, parts of the processing of the present embodiments may be distributed for better performance, reliability, and/or cost.

The term "computer readable medium" as used herein refers to any non-transitory medium that participates in providing instructions to the processor 1203 for execution. A computer readable medium may take many forms, including but not limited to, non-volatile media or volatile media. Non-volatile media includes, for example, optical, magnetic disks, and magneto-optical disks, such as the hard disk 1207 or the removable media drive 1208. Volatile media includes dynamic memory, such as the main memory 1204. Transmission media, on the contrary, includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present disclosure remotely into a dynamic memory and send the instructions over a telephone line using a modem. A modem local to the computer system 1201 may receive the data on the telephone line and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 may include the transmitter, the receiver, or both (i.e., a transceiver), of the present disclosure. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an integrated services digital network (ISDN) card. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc.). The signals through the various networks and the signals on the network link 1214 and through the communication interface 1213, which carry the digital data to and from the computer system 1201 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

Although the present disclosure as described relates to telephone numbers, the system may use alternate means of identifiers for making calls (i.e., email addresses, social security numbers, national identification numbers, or the like). In the United States, a social security number is a nine-digit number issued to U.S. citizens, permanent residents, and temporary (working) residents to track individuals for, at least, taxation purposes. A national identification number, or National Identity Card number, is used by the governments of many countries as a means of tracking their citizens, permanent residents, and temporary residents for the purposes of work, taxation, government benefits, health care, and other governmentally-related functions. The national identification number may, for example, appear on an identity card issued by a country.

Further, it should be appreciated that the exemplary embodiments of the present disclosure are not limited to the exemplary embodiments shown and described above. While this invention has been described in conjunction with exemplary embodiments outlined above, various alternatives, modifications, variations and/or improvements, whether known or that are, or may be, presently unforeseen, may become apparent. Accordingly, the exemplary embodiments of the present disclosure, as set forth above are intended to be illustrative, not limiting. The various changes may be made without departing from the spirit and scope of the invention. Therefore, the disclosure is intended to embrace all now known or later-developed alternatives, modifications, variations and/or improvements.

The invention claimed is:

1. A system for establishing a call using a single identifier, the system comprising:
    a registry device; and
    a call server, wherein
    the registry device is configured to,
        receive contact information relating to a single identifier from an uploading device, the contact information identifying at least one protocol,
        store the contact information received from the uploading device,
        retrieve the stored contact information and transmit a message including the contact information, in response to a request from the call server for the contact information relating to the single identifier, and
    the call server is configured to,
        receive a request from a first communication device to establish a call to a second communication device associated with the single identifier,
        request, from the registry device, the contact information relating to the single identifier,
        receive, from the registry device, the contact information relating to the single identifier,
        generate a list of protocols in response to the call server supporting a plurality of protocols,
        attempt to establish a call between the first communication device and the second communication device associated with the single identifier using the at least one protocol,
        remove the at least one protocol from the list in response to failing to establish the call between the first communication device and the second communication device associated with the single identifier using the at least one protocol due to one of a network error and a protocol error, and
        establish a call using a second protocol in the list, in response to failing to establish the call between the first communication device and the second communication device associated with the single identifier by using the at least one protocol.

2. The system according to claim 1, wherein the contact information identifies at least one Internet Protocol (IP) protocol.

3. The system according to claim 1, wherein the call server, when requesting from the registry device contact information relating to the single identifier, is configured to include in the request at least one protocol supported by the call server.

4. The system according to claim 3, wherein the registry device, when transmitting the message including the contact information, is configured to only include protocols supported by the call server.

5. The system according to claim 1, wherein the registry device, when retrieving the stored contact information relating to the single identifier and at least one of no suitable protocol exists in the registry and no contact information exists in the registry, is configured to transmit a second message indicating that no suitable contact information is available.

6. The system according to claim 1, wherein the call server, upon receiving a message that no suitable contact information is available, or upon the call server having tried to establish a call on the at least one protocol, is further configured to establish a telephone call using the single identifier as a telephone number.

7. The system according to claim 1, wherein the single identifier is a telephone number.

8. The system according to claim 1, wherein the single identifier is an email address.

9. The system according to claim 1, wherein the single identifier is a social security number.

10. The system according to claim 1, wherein the single identifier is a national identification number.

11. The system according to claim 1, wherein the call server is incorporated in one of the first communication device and the second communication device.

12. The system according to claim 1, wherein the at least one protocol is at least one of Session Initiation Protocol (SIP), H.323, and Jingle.

13. A method for establishing a call using a single identifier, the method comprising:
    receiving, by a registry device, contact information relating to the single identifier from an uploading device, the contact information identifying at least one protocol;
    storing, by the registry device, the contact information received from the uploading device;
    retrieving, by the registry device, the stored contact information and transmitting a message including the contact information, in response to a request from a call server for the contact information relating to the single identifier;
    receiving, by the call server, a request from a first communication device to establish a call to a second communication device associated with the single identifier;
    requesting, by the call server, from the registry device, the contact information relating to the single identifier;

receiving, by the call server, from the registry device, the contact information relating to the single identifier;

generating, by the call server, a list of protocols in response to the call server supporting a plurality of protocols, attempting, by the call server, to establish a call between the first communication device and the second communication device associated with the single identifier using the at least one protocol;

removing the at least one protocol from the list in response to failing to establish the call between the first communication device and the second communication device associated with the single identifier using the at least one protocol due to one of a network error and a protocol error, and establishing, by the call server, a call using a second protocol in the list in response to failing to establish the call between the first communication device and the second communication device associated with the single identifier by using the at least one protocol.

14. The method according to claim 13, wherein the contact information identifies at least one Internet Protocol (IP) protocol.

15. The method according to claim 13, further comprising including, by the call server, in the request at least one protocol supported by the call server, when requesting from the registry device contact information relating to the single identifier.

16. The method according to claim 15, further comprising including, by the registry device, the at least one protocol supported by the call server when transmitting the message including the contact information.

17. The method according to claim 13, further comprising transmitting, by the registry device, a second message indicating that no suitable contact information is available when retrieving the stored contact information relating to the single identifier and no contact information exists in the registry.

18. The method according to claim 13, further comprising establishing, by the call server, a telephone call using the single identifier as a telephone number, upon receiving a message that no suitable contact information is available.

19. The method according to claim 13, wherein the single identifier is a telephone number.

20. The method according to claim 13, wherein the single identifier is an email address.

21. The method according to claim 13, wherein the single identifier is a social security number.

22. The method according to claim 13, wherein the single identifier is a national identification number.

23. The method according to claim 13, wherein the call server is incorporated in one of the first communication device and the second communication device.

24. The method according to claim 13, wherein the at least one protocol is at least one of Session Initiation Protocol (SIP), H.323, and Jingle.

* * * * *